(12) United States Patent
Lu

(10) Patent No.: US 8,303,177 B2
(45) Date of Patent: Nov. 6, 2012

(54) PRE-HEAT TYPE CLINICAL THERMOMETER

(76) Inventor: Hsueh-Yu Lu, Taoyuan (TW)

( * ) Notice: Subject to any disclaimer, the term of this patent is extended or adjusted under 35 U.S.C. 154(b) by 0 days.

(21) Appl. No.: 12/078,460

(22) Filed: Mar. 31, 2008

(65) Prior Publication Data

US 2011/0243187 A1    Oct. 6, 2011

(51) Int. Cl.
*G01K 7/00* (2006.01)
(52) U.S. Cl. ......................................... 374/164
(58) Field of Classification Search ............... 364/164; 710/304; 600/549
See application file for complete search history.

(56) References Cited

U.S. PATENT DOCUMENTS

| | | | |
|---|---|---|---|
| 6,179,785 B1 * | 1/2001 | Martinosky et al. | 600/549 |
| 7,021,824 B2 * | 4/2006 | Wawro et al. | 374/208 |
| 7,255,475 B2 * | 8/2007 | Quinn et al. | 374/163 |
| 7,530,738 B2 * | 5/2009 | Price | 374/158 |
| 7,549,792 B2 * | 6/2009 | Bisch et al. | 374/121 |
| 7,988,355 B2 * | 8/2011 | Gierer | 374/208 |
| 2003/0002562 A1 * | 1/2003 | Yerlikaya et al. | 374/208 |
| 2003/0169802 A1 * | 9/2003 | Chen et al. | 374/164 |
| 2004/0240516 A1 * | 12/2004 | Harr | 374/121 |

FOREIGN PATENT DOCUMENTS

CN    201139557 Y  * 10/2008
JP       3141400 U  * 5/2008

* cited by examiner

*Primary Examiner* — Lisa Caputo
*Assistant Examiner* — Jamel Williams

(57) ABSTRACT

A pre-heat type clinical thermometer includes a pre-heat box, which is provided with an external heating module, a first terminal set and a control circuit, and a thermometer, which has a second terminal set, a temperature measurement module and an internal heating module. When the thermometer is inserted into the pre-heat box, the first terminal set and the second terminal set are electrically connected, and the control circuit controls the supply of electricity to the external heating module and the internal heating module to pre-heat the sensor tip and front neck of the thermometer subject to the temperature level of the sensor tip measured by the temperature measurement module.

4 Claims, 6 Drawing Sheets

PRE-HEAT TYPE CLINICAL THERMOMETER

BACKGROUND OF THE INVENTION

1. Field of the Invention

The present invention relates to thermometers and more particularly, to a pre-heat type clinical thermometer that pre-heats the sensor tip of the thermometer so that measurement of the temperature of a human body can be done quickly and accurately.

2. Description of the Related Art

Many pre-heat type clinical thermometers are known. Exemplars are seen in U.S. Pat. No. 6,109,784 entitled "FAST RESPONSE DIGITAL THERMOMETER" and U.S. Pat. No. 6,250,802 entitled "ELECTRONIC THERMOMETER WITH PREHEATING". These prior art designs use the internal battery to pre-heat the sensor tip so as to shorten the measuring time.

However, the pre-heating method of using a battery to pre-heat the sensor tip has the following drawbacks:

1. The power capacity of the internal battery of the thermometer is limited, using the internal battery to pre-heat the sensor tip consumes much the battery power and takes much time.

2. Before use, it is necessary to turn on the pre-heat function, and a waiting time is necessary before finish of the pre-heat function.

3. The pre-heat function simply pre-heats the sensor tip to the normal human body temperature range about 35° C.~37° C. Before the person to be measured is moved to the measuring position and the thermometer is attached to the selected part of the body of the person, the thermal energy may be dissipated from the sensor tip and the temperature of the sensor tip may be lowered, unable to effectively raise the measuring speed.

4. The heating wire of the pre-heat circuit extends to the deep inside of the sensor tip, increasing the heat capacity, and therefore the measuring time is relatively prolonged.

There is known another prior art pre-heat type clinical thermometer that uses a pre-heat box to heat the sensor tip of the thermometer directly. This design achieves rapid pre-heating of the sensor tip. However, when the user takes the thermometer out of the pre-heat box, the temperature of the sensor tip may drop rapidly due to the effect of the cold outside open air.

SUMMARY OF THE INVENTION

The present invention has been accomplished under the circumstances in view. It is one object of the present invention to provide a pre-heat type clinical thermometer, which pre-heats the thermometer internally as well as externally so that measurement of the temperature of a human body can be done quickly and accurately. It is another object of the present invention to provide a pre-heat type clinical thermometer, which can be used as an ordinary clinical thermometer when the pre-heat function is not necessary.

According to one aspect of the present invention, the pre-heat type thermometer is comprised of a pre-heat box and a thermometer. The thermometer has an internal heating module for pre-heating the front neck that supports the sensor tip. The pre-heat box comprises an external heating module for pre-heating the sensor tip of the thermometer after insertion of the thermometer into the pre-heat box. By means of pre-heating the thermometer internally and externally, the thermometer is rapidly pre-heated. After removal of the thermometer from the pre-heat box, the thermal energy of the internal heating module prevents rapidly dropping of the temperature of the front neck of the thermometer.

When the pre-heat type clinical thermometer is in use, the thermometer is pre-heated to a temperature level over 39° C., for example, 42° C. After removal of the thermometer from the pre-heat box, the outside cold air causes the temperature of the thermometer to drop to about the normal human body temperature level. If rising or dropping of temperature within a predetermined time period does not exceed by a predetermined value during measurement, the measurement is done. Therefore, the invention greatly shortens the measuring time.

Further, the pre-heat box is equipped with a battery and a power adapter cable. Therefore, the necessary working voltage for the internal heating module and the external heating module can be obtained the battery or an external power source. When the sensor tip and the front neck of the thermometer reached the predetermined temperature level, the temperature measurement module in the thermometer immediately outputs a temperature signal to the control circuit in the pre-heat box, and the control circuit then cuts off power supply from the internal heating module and the external heating module. When the temperature of the sensor tip dropped below the set value, the control circuit immediately drives on the internal heating module and the external heating module to heat the front neck and sensor tip of the thermometer to the predetermined temperature level.

DETAILED DESCRIPTION OF THE PREFERRED EMBODIMENT

Figure 1:
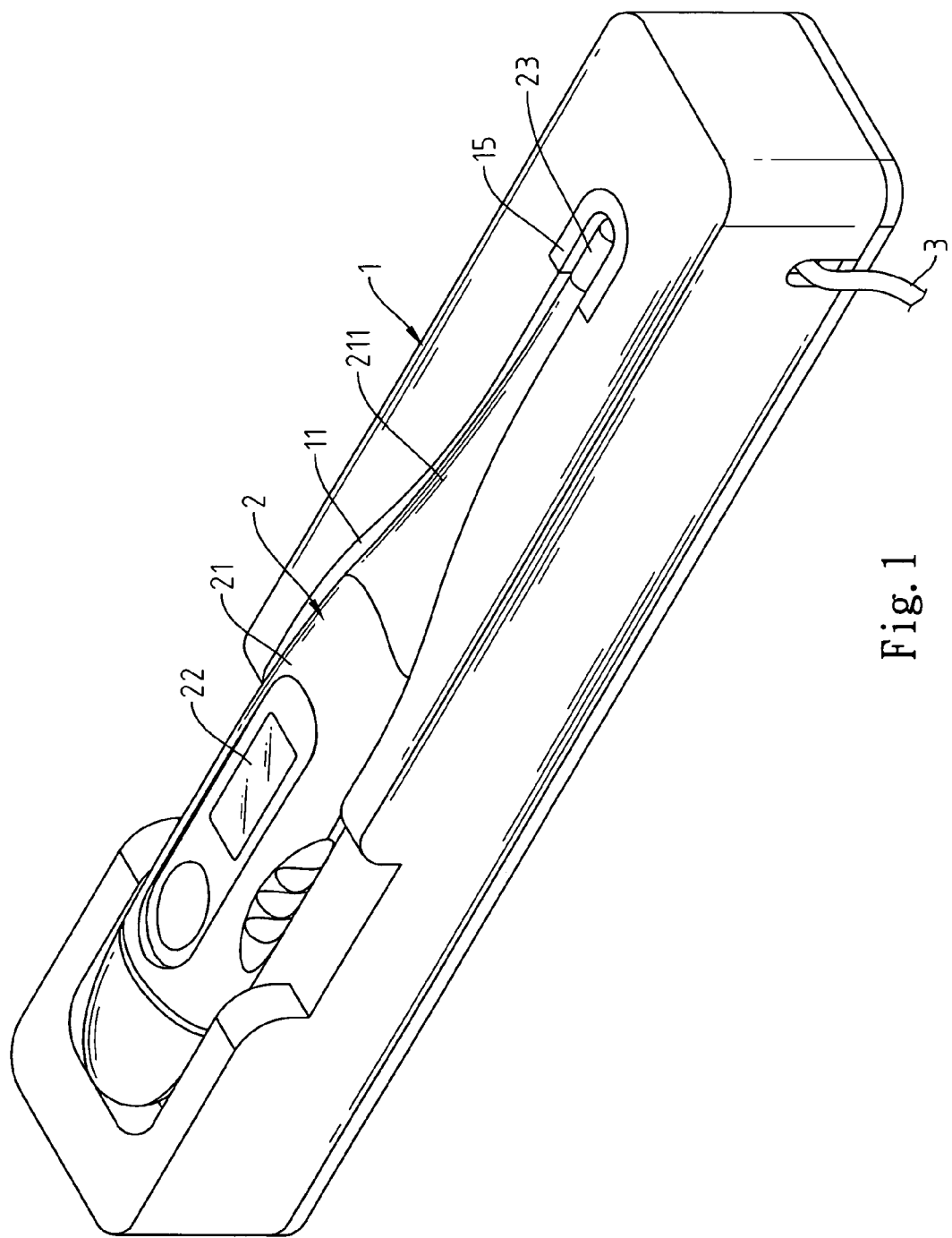
FIG. 1 is an elevational view of a pre-warn type clinical thermometer in accordance with the present invention.
Figure 2:
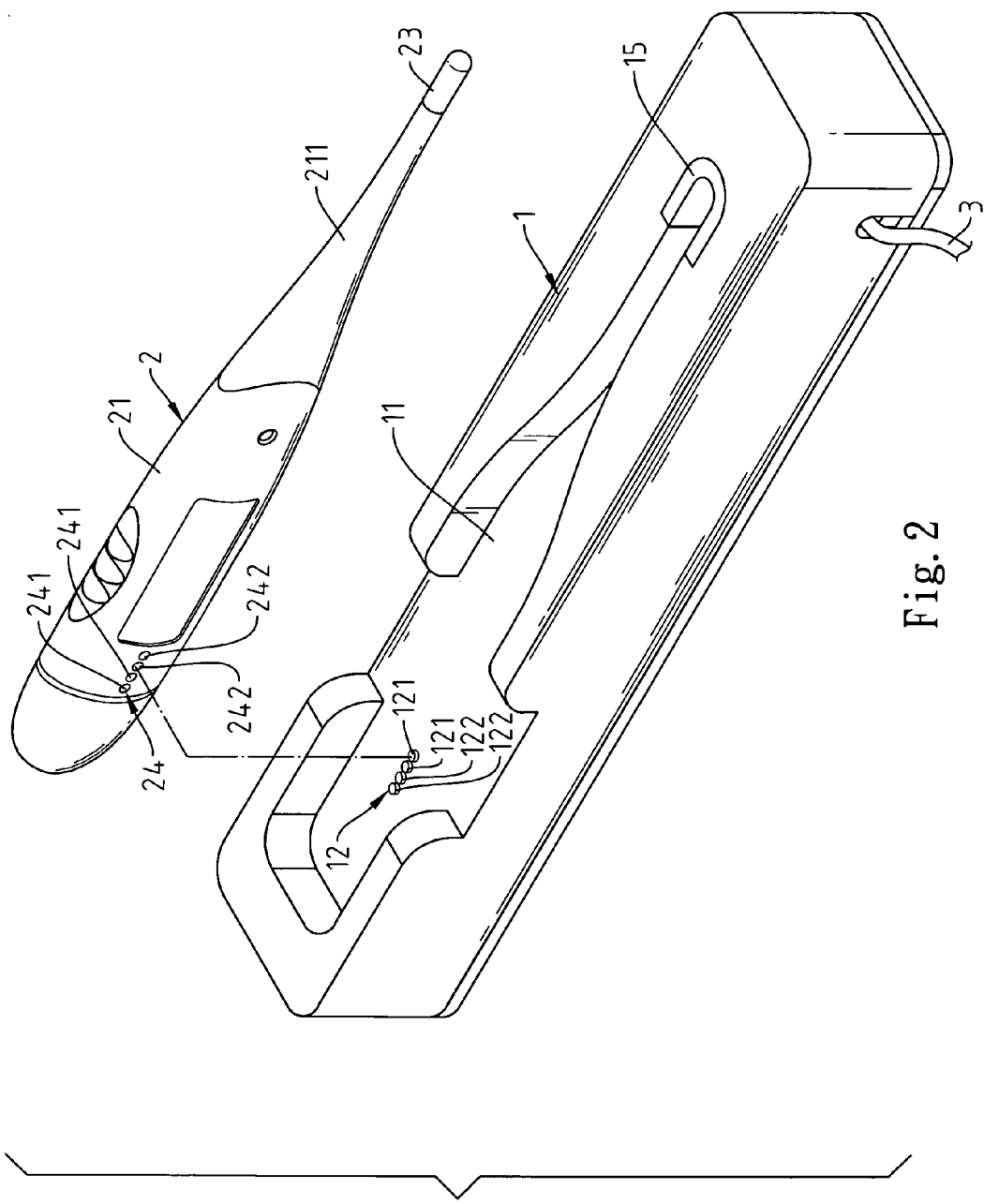
FIG. 2 corresponds to FIG. 1, showing the thermometer taken out of the pre-heat box.
Figure 3:
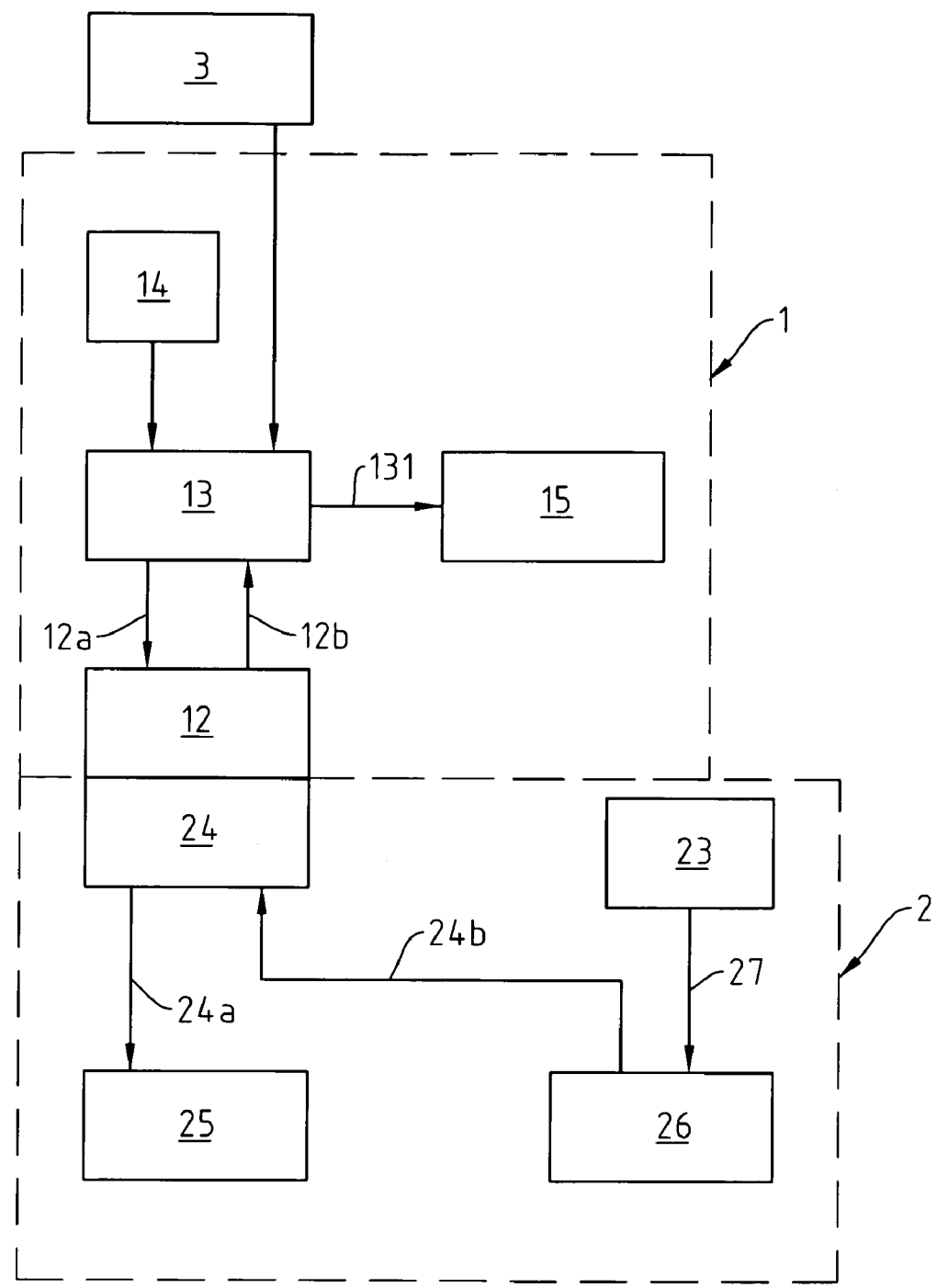
FIG. 3 is a control circuit block diagram of the pre-warn type clinical thermometer in accordance with the present invention.
Figure 4:
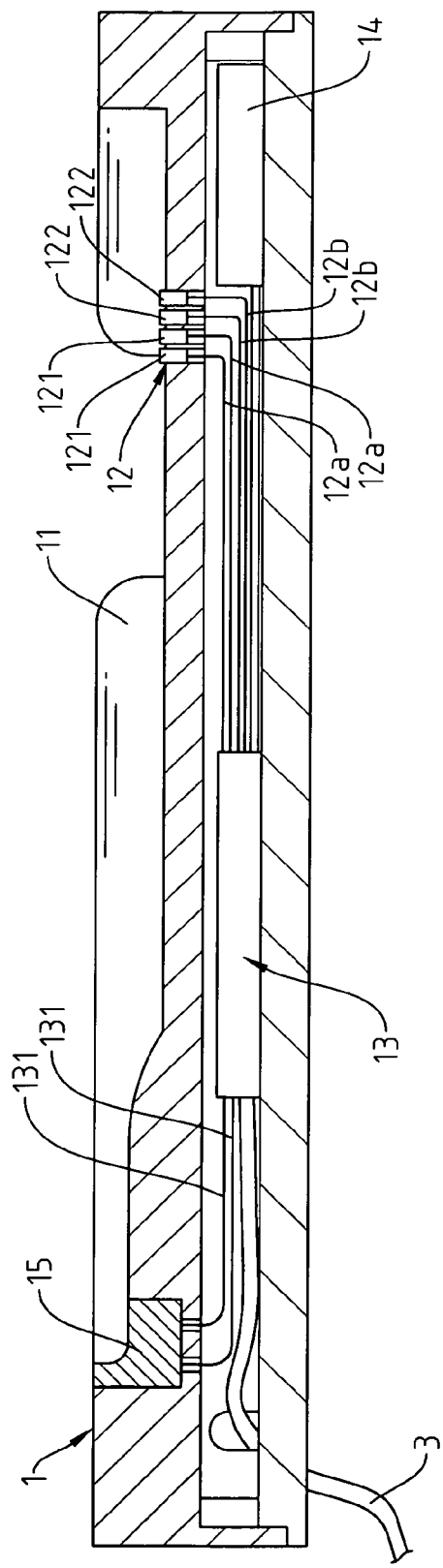
FIG. 4 is a sectional plain view of the pre-heat box of the pre-warn type clinical thermometer in accordance with the present invention.

Referring to FIGS. 1~4, a pre-heat type clinical thermometer in accordance with the present invention is shown comprised of a pre-heat box 1 and a thermometer 2.

The pre-heat box 1 comprises a power adapter cable 3 and a battery 14 for selectively providing the necessary working voltage, an accommodation top open chamber 11 for accommodating the thermometer 2, an external heating module 15 located on one end of the accommodation top open chamber 11 for pre-heating the thermometer 2, a terminal set 12 disposed at the other end of the accommodation top open chamber 11, and a control circuit 13 mounted therein beneath the accommodation top open chamber 11. The pre-heat box 1 provides electric energy to heat the external heating module 15 and an internal heating module 25 in the front neck 211 of the thermometer 2. After removal of the thermometer 2 from the pre-heat box 1, the thermometer 2 is used as a regular clinical thermometer.

The thermometer 2 comprises a body 21, the aforesaid front neck 211, a display 22, a sensor tip 23, a second terminal set 24, the aforesaid internal heating module 25, and a temperature measurement module 26. When the thermometer 2 is kept in accommodation top open chamber 11 of the pre-heat box 1, the sensor tip 2 approaches the external heating module 15, the second terminal set 24 is electrically connected to the first terminal set 12 of the pre-heat box 1. The temperature measurement module 26 controls display and alarm of the measured temperature.

Figure 5:
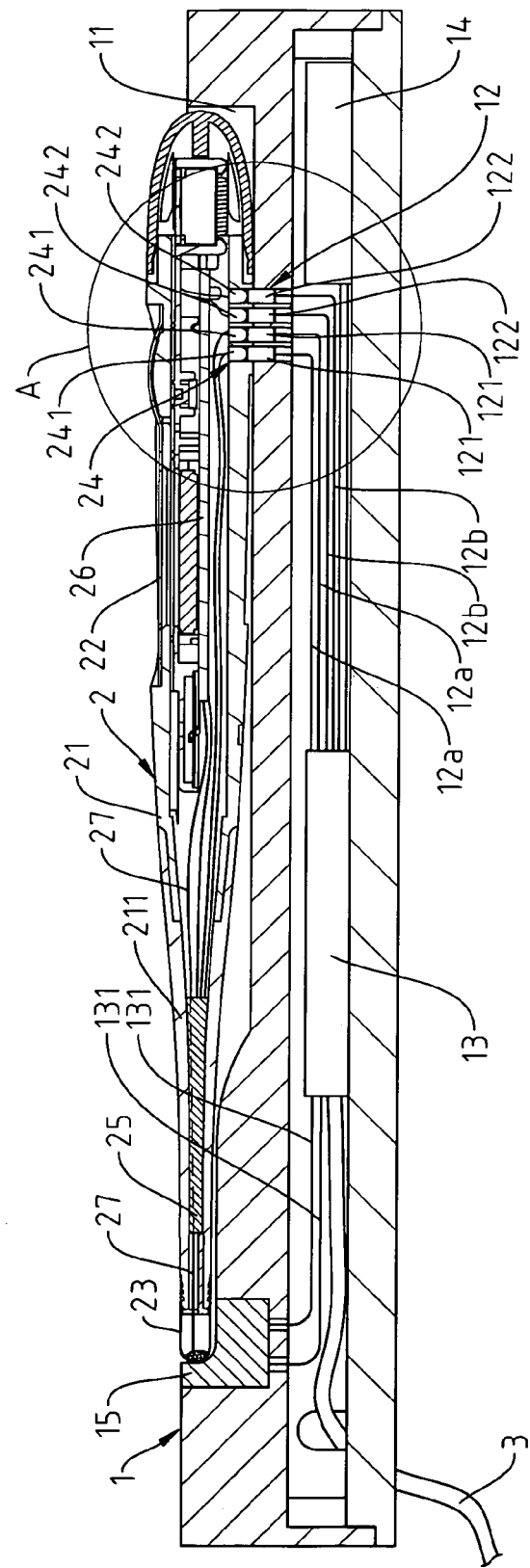
FIG. 5 is a sectional plain view of the pre-heat box of the pre-warn type clinical thermometer in accordance with the present invention.
Figure 6:
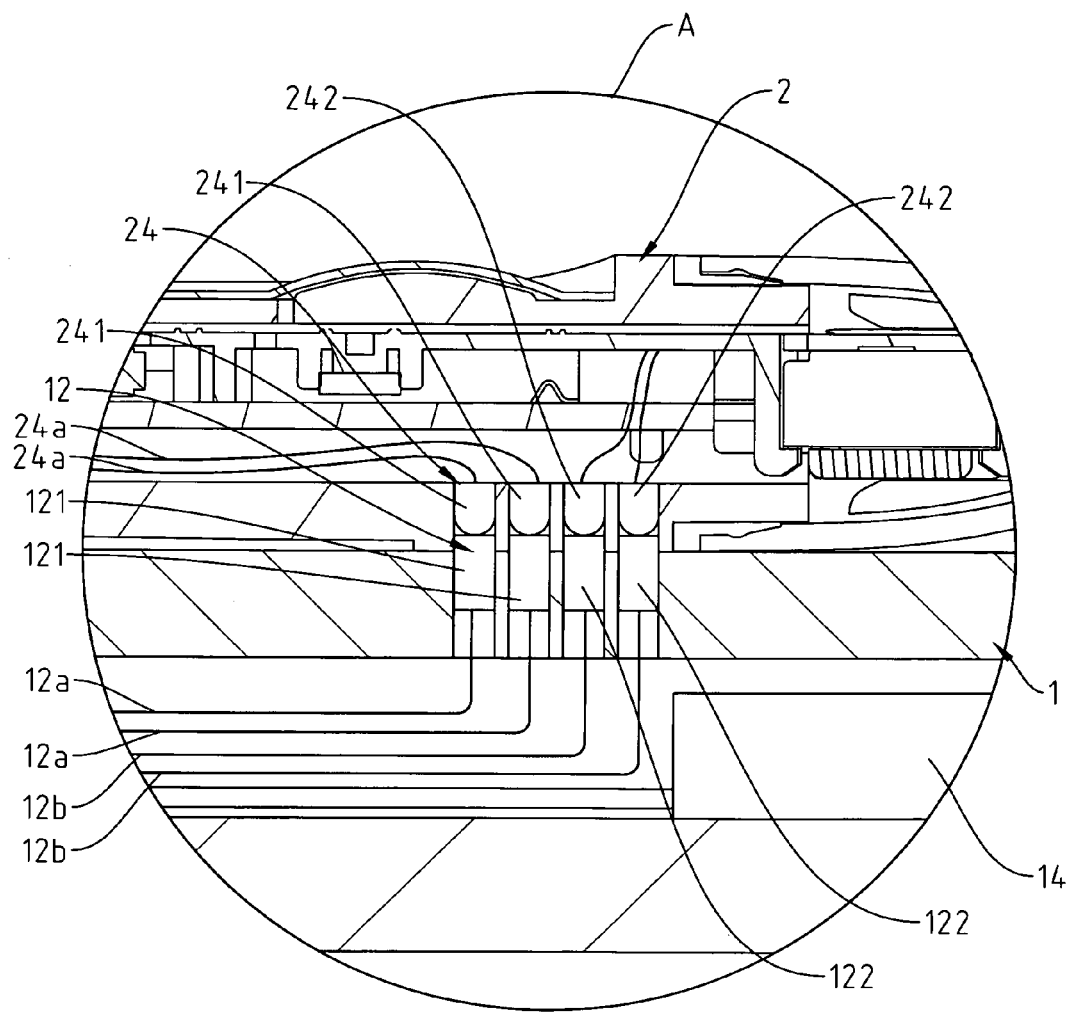
FIG. 6 is an enlarged view of part A of FIG. 5.

Referring to FIGS. 3~6, the internal heating module 25 is mounted in the front neck 211 between the body 21 and the sensor tip 23, and electrically connected to the second terminal set 24 by an electric wire 24a. When the second terminal set 24 of the thermometer 2 is electrically connected to the first terminal set 12 of the pre-heat box 1, the pre-heat box 1 provides electricity to the internal heating module 25. Further, the user can select the power adapter cable 3 or the battery 14 to provide the necessary working voltage. Further, the power adapter cable 3 and the battery 14 are electrically connected to the control circuit 13. The control circuit 13 is electrically connected with the external heating module 15 through a power line 131, and electrically connected with the first terminal set 12 through a power line 12a. The second terminal set 24 is electrically connected to the internal heating module 25 of the thermometer 2 through a power line 24a. Therefore, when the thermometer 2 is set in the pre-heat box 1, the control circuit 13 controls power supply from the power adapter cable 3 or the battery 14 to the internal heating module 25 and the external heating module 15.

The second terminal set 24 of the thermometer 2 and the first terminal set 12 of the pre-heat box 1 constitute a power connection structure and a signal connection structure. The power connection structure includes a pair of power terminals 121 of the first terminal set 12 and a pair of power terminals 241 of the second terminal set 24. When the second terminal set 24 of the thermometer 2 is attached to the first terminal set 12 of the pre-heat box 1, the power terminals 121 of the first terminal set 12 and the power terminals 241 of the second terminal set 24 are electrically connected. The aforesaid signal connection structure includes a pair of signal terminals 122 of the first terminal set 12 and a pair of signal terminals 242 of the second terminal set 24. When the second terminal set 24 of the thermometer 2 is attached to the first terminal set 12 of the pre-heat box 1, the signal terminals 122 of the first terminal set 12 and the signal terminals 242 of the second terminal set 24 are electrically connected.

The temperature measurement module 26 of the thermometer 2 is for connection between the sensor tip 23 and the control circuit 13. Further, the temperature measurement module 26 of the thermometer 2 is electrically with the sensor tip 23 through a signal line 27. Therefore, the temperature measurement module 26 obtains a temperature signal from the sensor tip 23 through the signal line 27. Further, the temperature measurement module 26 of the thermometer 2 is electrically connected with the second terminal set 24 through a signal line 24b, and the control circuit 13 is electrically connected with the first terminal set 12 with a signal line 12b. The temperature signal outputted by the temperature measurement module 26 goes through the signal line 24b to the second terminal set 24 and the first terminal set 12 and then through the signal line 12b to the control circuit 13.

When the thermometer 2 is set in the pre-heat box 1, the second terminal set 24 is electrically connected to the first terminal set 12. At this time, electricity is transmitted to the internal heating module 25 subject to the control of the control circuit 13. When started the pre-heat type clinical thermometer, the external heating module 15 pre-heats the sensor tip 23 of the thermometer 2, the internal heating module 25 pre-heats the front neck 211 of the thermometer 2, and at the same time the temperature measurement module 26 transmits the temperature signal of the sensor tip 23 through the second terminal set 24 and the first terminal set 12 to the control circuit 13 in the pre-heat box 1. When the temperature of the sensor tip 23 of the thermometer 2 reaches a predetermined level (preferably 39° C. up, or most preferably 42° C.), the control circuit 13 immediately cuts off power supply from the external heating module 15 and the internal heating module 25. On the contrary, when the temperature of the sensor tip 23 of the thermometer 2 is below the predetermined level, the control circuit 13 immediately turns on power supply, driving the external heating module 15 and the internal heating module 25 to heat the sensor tip 23 and front neck 211 of the thermometer again.

By means of controlling the external heating module 15 and the internal heating module 25 to heat the sensor tip 23 and front neck 211 of the thermometer 2 and using an external power supply to warm up the thermometer 2, the thermometer 2 is rapidly and evenly warmed up. Further, because the internal heating module 25 is provided inside the thermometer 2, the temperature of the thermometer 2 is maintained for a certain length of time after removal of the thermometer 2 from the pre-heat box 1.

According to tests, when the thermometer is taken out of the pre-heat box and attached to the body of a person in a room temperature environment after the thermometer has been pre-heated to about 42° C., the cold air in the room temperature environment will cause the temperature of the thermometer to drop to about 35° C.~37° C., approximately equal to the normal temperature of a human body. If rising or dropping of temperature within a predetermined time period does not exceed by 0.1° C. during measurement, the measurement is done. Because the body temperature does not drop due to thermal absorption by the thermometer, the measuring time is shortened. Therefore, the invention achieves the function of rapid pre-heat as well as the function of rapid measurement Although a particular embodiment of the invention has been described in detail for purposes of illustration, various modifications and enhancements may be made without departing from the spirit and scope of the invention.

What the invention claimed is:

1. A pre-heat type clinical thermometer, comprising:
a pre-heat box, said pre-heat box comprising an accommodation chamber, an external heating module mounted in one end of said pre-heat box, a first terminal set, a power source means, and a control circuit for controlling supply of electricity from said power source means to said first terminal set and said external heating module; and
a thermometer insertable into said accommodation chamber, said thermometer comprising a front neck extending from a body of the thermometer, a sensor tip extending from said front neck, a second terminal set, which is electrically connectable to the first terminal set of said pre-heat box after insertion of said thermometer into said accommodation chamber, a temperature measurement module adapted to transmit a temperature signal from said sensor tip to said control circuit after connection of the second terminal set of said thermometer to the first terminal set of said pre-heat box, and an internal heating module mounted in said front neck between the body and the sensor tip, the internal heating module adapted for heating said front neck subject to the control of said control circuit after insertion of said thermometer into said accommodation chamber;
wherein said control circuit electrically connects said power source means to the first terminal set of said pre-heat box and the second terminal set of said thermometer after insertion of said thermometer into said accommodation chamber and connection of the second terminal set of said thermometer to the first terminal set of said pre-heat box when the temperature value of said sensor tip obtained from said temperature measurement module is below a predetermined level, driving said external heating module and said internal heating module to heat said sensor tip and said front neck of said thermometer; said control circuit disconnects said power source means from the first terminal set of said pre-heat box to turn off said external heating module and said internal heating module when the temperature value of said sensor tip obtained from said temperature measurement module surpasses said predetermined level;

wherein the first terminal set of said pre-heat box comprises at least a power terminal and at least a signal terminal, and the second terminal set of said thermometer comprises at least a power terminal and at least a signal terminal that are respectively electrically connectable to the at least a power terminal and at least a signal terminal of the first terminal set of said pre-heat box after insertion of said thermometer in said accommodation chamber.

2. The pre-heat type clinical thermometer as claimed in claim 1, wherein the first terminal set of said pre-heat box comprises a pair of power terminals and a pair of signal terminals, and the second terminal set of said thermometer comprises a pair of power terminals and a pair of signal terminals that are respectively electrically connectable to the power terminals and signal terminals of the first terminal set of said pre-heat box after insertion of said thermometer in said accommodation chamber.

3. The pre-heat type clinical thermometer as claimed in claim 1, wherein said power source means is electrically connected to said control circuit; said control circuit comprises a first power line electrically connected to said external heating module and a second power line electrically connected to the first terminal set of said pre-heat box; said internal heating module has a power line electrically connected to the second terminal set of said thermometer.

4. The pre-heat type clinical thermometer as claimed in claim 1, wherein said control circuit comprises a signal line electrically connected to the first terminal set of said pre-heat box; said temperature measurement module comprises a first signal line electrically connected with said sensor tip for receiving a temperature signal from said sensor tip, and a second signal line electrically connected with the second terminal set of said thermometer for transmitting the temperature signal received from said sensor tip to said control circuit through the second terminal set of said thermometer and the first terminal set of said pre-heat box and the signal line of said control circuit.

* * * * *